United States Patent

Doeff et al.

[11] Patent Number: 5,443,601
[45] Date of Patent: Aug. 22, 1995

[54] METHOD FOR INTERCALATING ALKALI METAL IONS INTO CARBON ELECTRODES

[75] Inventors: Marca M. Doeff, Hayward; Yanping Ma; Steven J. Visco, both of Berkeley; Lutgard DeJonghe, Lafayette, all of Calif.

[73] Assignee: Regents, University of California, Berkeley, Calif.

[21] Appl. No.: 55,709

[22] Filed: May 3, 1993

[51] Int. Cl.⁶ .................... H01M 6/18; H01M 4/62
[52] U.S. Cl. ................... 29/623.5; 429/192; 429/212; 429/217
[58] Field of Search ........... 429/218, 192, 212, 217; 252/182.1; 29/623.5

[56] References Cited

U.S. PATENT DOCUMENTS

| | | | |
|---|---|---|---|
| 4,551,267 | 11/1985 | Fushimi et al. | 429/212 X |
| 5,019,467 | 5/1991 | Fujiwara | 429/192 X |
| 5,030,523 | 7/1991 | Neat et al. | 429/192 X |
| 5,219,680 | 6/1993 | Fauteux | 429/192 |

Primary Examiner—John S. Maples
Attorney, Agent, or Firm—Paul R. Martin; Kathleen Dal Bon

[57] ABSTRACT

A low cost, relatively flexible, carbon electrode for use in a secondary battery is described. A method is provided for producing same, including intercalating alkali metal salts such as sodium and lithium into carbon.

20 Claims, No Drawings

METHOD FOR INTERCALATING ALKALI METAL IONS INTO CARBON ELECTRODES

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to a method for intercalating alkali metal ions into carbon. More specifically it relates to producing carbon electrodes for secondary batteries.

BACKGROUND OF THE INVENTION

Battery Electrode

The present invention concerns the fabrication of carbon electrodes into which alkali metal ions have been electrochemically intercalated. These inventive improved electrodes are particularly suitable for use as negatives for secondary batteries.

Prior art methods for this process require the use of a liquid electrolyte, such as propylene carbonate, and a second electrode that acts as a source of alkali metal ions, either the pure metal itself Dr an intercalated metal oxide. When intercalated metal oxide is used, the configuration is known as a "rocking chair" battery, in which ions rock back and forth between electrodes during charge and discharge of the cell. These batteries have gained much attention in the research community recently, in part due to claims of enhanced safety over conventional cells. Presumably, this derives from the fact that no metallic lithium or sodium is ever in direct contact with the liquid electrolyte in this configuration. However, if rocking chair cells are overdischarged or if the capacities of the electrodes are not carefully matched, metal plating can occur, and the benefits of the configuration are negated.

For the past several years, much attention has been focused on the development of lithium ion type rocking chair batteries. In these cells, a carbon electrode is used as the negative and a lithium intercalating material such as $MnO_2$ is used as the positive electrode. Such cells are normally assembled in the discharged state (i.e. the positive electrode is already doped with ions) with an appropriate liquid electrolyte and battery separator. Upon charging the cell, the lithium ions move out of the positive electrode and intercalate into the carbon electrode. Upon cell discharge, the reverse process occurs, the lithium moves out from the carbon and into the positive electrode.

Experimental rocking chair cells have indeed shown excellent reversibility, but metal plating can and does occur if cells are overcharged or overdischarged. Thus, the claim of improved safety is, at best, a dubious one, and does not hold under conditions of cell abuse.

Another issue of concern to users is that of the energy density penalty entailed in using the rocking chair configuration. One of the most attractive features of many lithium batteries is their high gravimetric energy densities, a function of the extremely low equivalent weight and density of lithium metal itself.

In spite of these difficulties, however, the rocking chair cells remain attractive alternatives to those using alkali metals, particularly if the dangers associated with plating metal in an organic liquid medium can be avoided. By using a solid polymer electrolyte as the separator and as the binder in both the carbon and the metal oxide electrodes, this difficulty is somewhat ameliorated, and the claim of improved safety for rocking chair cells holds even under conditions of extreme abuse. Additionally, the fact that the electrodes and separator are fabricated into thin, easily handled films simplifies device assembly as well. It is possible to assemble cells into series stacks readily; an option that is not available when liquid electrolytes are used.

SUMMARY OF THE INVENTION

The present invention is a method for intercalating alkali metal ions into carbon electrodes.

It is an object of the present invention to provide a method for intercalating alkali metal ions into carbon electrodes.

It is a further object of the present invention to provide a method for manufacturing electrodes which is environmentally sound.

It is a further object of the present invention to provide a method for manufacturing electrodes which do not require the use of a liquid electrolyte.

It is a further object of the present invention to provide a method for manufacturing an environmentally sound electrode for solid state batteries, It is a further object of the present invention to provide an easily implemented method for manufacturing electrodes.

It is a further object of the present invention to provide a cost effective method for manufacturing electrodes.

It is a further object of the present invention to provide a method for manufacturing electrodes which may be used in rocking chair cells.

These and other objects and features of the invention will become more fully apparent when the following detailed description of the invention is read.

DETAILED DESCRIPTION OF THE INVENTION

General Method of Assembly

There are three basic steps to the method of the present invention. First, carbon particles, an ion conducting polymer, an alkali metal salt, and a carbon dispersant are combined with a solvent and thoroughly mixed. Second, the mixture is poured onto Teflon coated plates and allowed to air dry in order to remove the solvent. The resulting material is then peeled, cut, and weighed. Alternatively, premeasured amounts of the initial mixture could be poured directly onto current collectors and allowed to air dry. Third, independent of which second step is followed the material is dried in order to remove any residual water.

In the present invention, the intercalation is accomplished in the solid state by using a polymer electrolyte in place of the liquid electrolyte, and by assembling the cell in a thin film arrangement. Even if metal plating were to occur inadvertently, the use of all solid state components ensures safety and also avoids the complications associated with cointercalation of solvent into the carbon electrode. Furthermore, the use of thin film components simplifies assembly of cells and allows fabrication of series stacks, a configuration that is difficult or impossible to achieve when liquid electrolytes are used.

Although rocking chair cells function with other alkali metals such as sodium, most research efforts has focused on lithium ion cell development. By the inventive use of carbon as the negative electrode, the disadvantages of metallic lithium are presumably avoided; i.e. the tendency to form dendrites upon charge, and the hazards associated with the combination of an alkali of metal and an organic liquid.

Use of Carbon

Carbon has been employed in some battery systems in various capacities, including for use as electrodes. Most types of carbon useful for battery applications can only intercalate one lithium ion per twelve carbon atoms, the gravimetric capacity density of the anode is substantially decreased in comparison to lithium metal itself, resulting in lowered energy density; for rocking chair batteries. This loss is somewhat ameliorated by the fact that a fourfold excess of lithium is usually necessary for extended cycle life in rechargeable batteries, whereas only a slight excess of anode material is required in the rocking chair analogs. Various types of carbon have long been found to be useful in electrochemical applications; as capacitor materials, as catalysts for electrode reactions, as additives to impart electronic conductivity to battery electrodes, and finally as anodes for rocking chair cells. Carbon exists in numerous forms (e.g. fibrous, vitreous, or powder) and crystal structures (from completely amorphous materials to the highly ordered graphite and fullerenes), depending upon treatment method and source. The level of impurities, and the nature of the surface groups differ greatly from one type to another. The chemistry of carbon is highly dependent upon all of these factors.

The reaction of carbon most relevant to the inventive rocking chair batteries is that of reductive intercalation of alkali metals (equation 1).

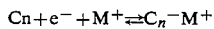

$$C_n + e^- + M^+ \rightleftharpoons C_n^- M^+$$

$$M = Li, Na, K \text{ etc.} \qquad (1)$$

Although intercalated carbon compounds may be produced chemically by direct reaction with the alkali metal of interest, electrochemical methods are most useful for battery applications. Cells are assembled with a carbon electrode, separator/electrolyte and a counter electrode that acts as a source of alkali metal ion. If desired, a reference electrode may be included, and the extent of reaction may be controlled by setting the potential or the current across the cell.

Intercalation

Intercalation may be directly observed and distinguished from double layer charging, a nonfaradaic process, using cyclic voltammetry. In these experiments, the potential of the carbon electrode vs. a reference electrode, in a cell with a three electrode configuration and a source of ions, is rapidly swept and the current is measured. Faradaic processes result in a characteristic current peak at the thermodynamically or kinetically favored potential. By reversing the direction of the scan, the reversibility of the faradaic process and thus the suitability of the electrode for secondary batteries may also be determined.

Numerous carbons have been found to undergo reductive intercalation or insertion of alkali metal ions. The intercalation of lithium ions into graphite and petroleum coke has been extensively studied in connection with battery applications. Graphite consists of layers containing carbon bound in a hexagonal network as shown in the figure below. The strata are staggered in either an AB (hexagonal) or ABC (rhombohedral) pattern.

Intercalation of alkali metal ions occurs between the layers, and proceeds in stages to form compounds of distinct stoichiometries. Thus, the first stage graphite intercalation compound of potassium has the formula $C_8K$ whereas that of lithium has the formula $C_6Li$.

The degree of perfection of the crystal structure of graphite is dependent upon the preparation method, and affects the rate and extent to which intercalation can take place. Petroleum coke, which may be regarded as a highly defective graphite, undergoes intercalation more rapidly than graphite but the reaction only proceeds to $C_{12}Li$.

Electrochemical intercalation may also be affected by the nature of the liquid electrolyte in conventional cells. The liquid tends to solvate the alkali metal ions and is co-intercalated in the carbon electrode. In some cases, the desired reaction may be slowed or completely inhibited by the solvent. For example, lithium does not intercalate into graphite if propylene carbonate alone is used as the electrolyte. If a mixture of ethylene carbonate and propylene carbonate is used, the reaction then proceeds. Additionally, the chemical properties (e.g. electronic conductivity, voltage profile, etc.) of the carbon anode may be modified in an uncontrolled fashion due to inclusion of solvent. Thus, the choice of liquid electrolyte (and therefore, possibly, cathode material) for rocking chair batteries is restricted.

In contrast, co-intercalation of polymer from a solid polymer electrolyte does not occur due to the large size of the molecule. The difficulties associated with solvent cointercalation may therefore be completely avoided while accomplishing alkali metal intercalation reliably and reproducibly in cells, by using solid polymer electrolytes.

Ionically Conducting and Gelled Polymers

We should make a distinction here between ionically conducting polymers that contain no additives, such as polyethylene oxide complexes of lithium or sodium salts, and mixtures of polymers with additives that are liquid at or near room temperature. This latter category can be referred to as gelled electrolytes or solvent-swollen electrolytes. They handle like solids; but contain appreciable amounts of a non-volatile liquid such as propylene carbonate or PEGDME, that does not evaporate even when the components are dried gently.

In the preparation of electrodes containing a gelled or solvent-swollen electrolyte, the additive may be mixed into the formulation directly before the electrodes are cast (it may either replace the solvent entirely or be used in addition to the solvent). The electrodes would then be cast and dried gently, so as not to remove the liquid additives. For example, polyacrylonitrile and a lithium salt may be dissolved into ethylene carbonate, heated gently, then cast into films.

Alternatively, the electrodes may be cast and dried without the additive and, which is then applied directly prior to use. For example, electrodes containing polyethylene oxide, carbon, an alkali metal salt, and the dispersant are cast and dried thoroughly. Prior to use, propylene carbonate in the desired quantity is syringed or swabbed onto the electrode.

Embodiments of the Method

In one embodiment, thin film electrodes were cast onto Teflon coated glass from acetonitrile solutions containing 30–60 percent by weight electroactive carbon, 0–10 percent by weight Shawinigan black carbon, 2 percent by weight carbon dispersant, and remainder polymer electrolyte (solution 2–5 percent by weight solids).

The carbon powder used, either as supplied by the manufacturer or ground for 5–25 hours in an attritor mill and dried under vacuum for at least 24 hours, should have a particle size of between 1–2 microns in diameter. For the carbon dispersant: polyoxyethylene (4) lauryl ether, polyoxyethylene (23) lauryl ether, polyoxyethylene (20) cetyl ether, polyoxyethylene(20) stearyl ether, polyoxyethylene (20) oleyl ether, and Triton X-100 TM are all suitable materials.

The polymer electrolyte consisted of an ion-conducting polymer such as polyethylene oxide (PEO) complexed with an appropriate alkali metal salt (for example, sodium trifluoromethanesulfonate (NaTf), sodium perchlorate ($NaClO_4$), lithium trifluoromethanesulfonate (LiTf), etc.) in a ratio of 8–20 ethylene oxide units per alkali metal ion.

The films were dried in air, cut to the desired size, and dried in vacuo for at least 72 hr. Alternatively, the electrodes were cast directly onto current collectors (sheets of stainless steel, metal-coated plastic films, etc.) and dried as above. Film thicknesses were estimated to be 10–100 $\mu$m.

The separator was cast into thin freestanding films onto Teflon coated glass from an acetonitrile solution containing polymer electrolyte (solution 2–5 percent by weight solids) and dried in air and then under vacuum for at least 72 hours. The polymer electrolyte consisted of an ion conducting polymer such a polyethylene oxide complexed with an alkali metal salt as described above. Film thicknesses were estimated to be 10–100 $\mu$m.

A loss of about 20% of the lithium ions is commonly seen in carbon cells with liquid electrolytes and has been attributed to irreversible reactions of lithium with impurities on the carbon surface. Apparently a similar process occurs in the solid state with sodium ions. The voltage instability seen in the later cycles in is due to dendrite formation, a common problem with sodium anodes. One reason to use carbon as an anode material in batteries (e.g. in a rocking chair configuration) is to avoid the metal plating process during recharge that can lead to dendrites and the resulting shortened life span of the cell.

In a preferred embodiment, the electrodes were cast onto Teflon coated plates from an acetonitrile (total 2% solids) solution containing 45% by weight Conoco petroleum coke that has been ground for 5 hours in an attritor mill, 2% by weight Brij-35, also known as polyoxyethylene(23) lauryl ether, the remainder is comprised of polyethylene oxide and sodium triflate ($P(EO)_8NaTf$). After casting, the electrodes were dried and cut to size. The electrodes where then vacuum dried and used in sodium cells and rocking chair cells.

Assembling the Cells

Sodium, lithium or sodium cobalt bronze electrodes function as the alkali metal ion sources for the cells. Cells were assembled by layering the ion source electrode, then the separator, then the carbon electrode between two current collectors, to which electrical contact was made. The current collectors may be surfaces of battery coin cell holders, thin foils of stainless steel or nickel, metal coated plastic or surfaces of spring-loaded cell holders such as shown below. The latter configuration was used for most of the experiments described herein. When polyethylene oxide complexes were used, cells were heated to 77°–90° C. in order to render the polymer electrolytes conductive.

The most convenient way to assemble such a cell is to layer a carbon electrode, appropriate polymer electrolyte and a composite cathode containing the ion source material prepared in a completely or partially discharged state. As discussed, if a gelled or solvent-swollen polymer electrolyte is used it may be necessary to reapply some of the non-volatile liquid polymer solvent to the cell before use. The cell is then charged before use. It is possible, although less convenient, to assemble the cell in the charged state as well. In this case, the carbon electrode would already contain intercalated ions, by discharging ions into it from an alkali metal source electrode first, and the cathode would be prepared in the charged state. For this experiment rocking chair cells were assembled in the partially discharged state and charged first.

For all rocking chair batteries, it is critical to match capacities of the electrodes carefully or else cell performance will be adversely affected. If there is a large disparity between the capacities of the cathode and anode, metal plating can occur. Because a solid polymer electrolyte is used in the examples described herein, the dangers associated with alkali metal in contact with liquid are completely avoided. However, if the electrodes are poorly matched, the full cell voltage will not be obtained upon charge due to incomplete utilization of the higher capacity electrode. While this is not a dangerous situation, it means that the maximum practical power density of the battery cannot be obtained. In practice, electrode matching can be somewhat difficult to achieve, particularly if one electrode is in the partially, rather than fully discharged state. Nonproductive reactions of alkali metal during charge and discharge must also be taken in account (for example, the initial irreversible loss of sodium intercalated into carbon).

The below examples served to show that intercalation of alkali metal into carbon occurs readily for solid state cells with polymer electrolytes, and that rates and extent of intercalation are great enough to make these carbon electrodes useful in solid state rocking chair batteries.

It will be recognized by those skilled in the art that this description may not be the only possible description of the present invention.

EXAMPLES

The following examples are included for the purpose of illustrating the present invention and are not intended to limit the scope of the invention in any manner.

Example 1

Electrochemical Intercalation of Sodium into Petroleum Coke from Sodium Metal

Petroleum coke electrodes were fabricated from Conoco grade 3 XP battery carbon, polyethylene oxide (average molecular weight $5 \times 10^6$) and sodium triflate (Na:EO ratio 1:8). For some experiments, petroleum coke was ground 5 or 25 hours in an attritor mill before incorporation into the electrodes, for other experiments the carbon was used as supplied by the manufacturer. Separators with the composition $P(EO)_8NaTf$ were used in cells containing the petroleum coke electrodes and sodium or sodium-lead alloy counter electrodes. Cells were heated to 86° C. before discharge at various rates. A voltage cutoff of 0.02–0.05 V was employed to avoid plating metal onto the carbon electrodes during discharge. Open circuit potentials varied from about 1.5–2.5 V. The extent of intercalation is a function of the grinding time to which the carbon was subjected (i.e. particle size); carbon ground for twenty-five hours intercalates to composition $NaC_{12}$ while unground carbon intercalates only to $NaC_{135}$. The extent of intercalation was the same for 30 percent by weight carbon electrodes as for 45 percent by weight carbon electrodes. The extent of intercalation varied only slightly as a function of current density, suggesting that this process occurs rapidly. This also implies relatively high rate capabilities for this process in carbon anodes used in a rocking chair battery configuration. De-intercalation also appears to be facile, as cells exhibited good reversibility with only a small initial loss of sodium ions.

Because petroleum coke undergoes intercalation of sodium ions rapidly and reversibly, it is expected to be the preferred anode material for use in solid polymer electrolyte rocking chair batteries. The best configuration, in terms of maximizing energy density, reversibility, and rate capability, is a cell containing a petroleum coke anode in which the carbon has been ground for at least 5 hours in an attritor mill, to a particle size of 1–2 microns. This anode would also have high loading levels of electroactive material (45 percent by weight or more) in order to achieve a high energy density for the cell. The cathode material can then be any reasonable electroactive material that contains sodium ions in the reduced state, for example, the sodium cobalt bronzes ($Na_xCoO_2$), $NaxMnO_2$, or a sodium organodithiolate salt (the solid redox polymerization electrode).

Example 2

Electrochemical Intercalation of Lithium into Petroleum Coke from Lithium Metal Petroleum coke electrodes were fabricated from Conoco grade 3 XP battery carbon, polyethylene oxide (average molecular weight $5 \times 10^6$) and lithium triflate (Li:EO ratio 1:8). For some experiments, petroleum coke was ground 5 or 25 hours in an attritor mill before incorporation into the electrodes, for other experiments the carbon was used as supplied by the manufacturer. Separators with the composition P (EO)$_8$LiTf were used in cells containing the petroleum coke electrodes and lithium counter electrodes. Cells were heated to 85° C. before discharge. Open circuit potentials varied from about 1.8–2.9 V. A voltage cutoff of 0.05 V was employed to prevent lithium plating during discharge. The extent of intercalation varied as a function of grinding time to which the carbon was subjected, as with the sodium case. For carbon ground for 25 hours, full intercalation to $LiC_{12}$ was achieved. The current interrupts show little overpotential for this process at 25 $\mu A/cm^2$, indicating that this process occurs with ease at this current density. This implies good rate capability for solid polymer electrolyte rocking chair batteries. However, the lithium cells exhibited slightly less reversibility than the sodium cells.

Example 3

Electrochemical Intercalation of Lithium into Graphite from Lithium Metal

Graphite electrodes were fabricated from graphite powder (Union Carbide National Spectroscopic Powder, Grade SP-2) without further grinding, polyethylene oxide (average molecular weight $5 \times 10^6$) and lithium triflate (Li:EO ratio 1:8). Separators with the composition P (EO)$_8$LiTf were used in cells containing the graphite electrodes and a lithium counter electrode. At 90° C., the open circuit potential read 1.68 V. The first galvanostatic discharge of lithium into graphite was 37.5 $\mu A/cm^2$. At this rate, the composition $LiC_{12}$ is achieved in approximately 10 hours for this cell. A cutoff of 0.05 V was used in order to prevent plating of Li metal onto the graphite. Although this voltage was reached at the end of discharge, the current interrupts show that the open circuit voltage was much higher than this, indicating that the graphite was not fully intercalated.

The rather large polarization seen in this cell suggests that the process of intercalating lithium into graphite is slow, and that further intercalation could be achieved by decreasing the current. In cells with liquid electrolytes, $LiC_6$ is achieved only after forty hours of discharge. Furthermore, true intercalation in the liquid cells does not occur above 0.4 V, instead lithium reacts irreversibly with impurities adsorbed onto the surface of the graphite particles. This apparently is true of the solid state cells as well; only about 60% of the original discharge was recovered during subsequent charge. Due to these irreversible processes and the rather slow rate at which lithium appears to intercalate into graphite, use of this type of carbon in a solid polymer electrolyte rocking chair cell would probably be restricted to applications in which high power densities are not required, or to configurations in which protective additives are used to prevent irreversible loss of lithium.

Example 4

Rocking Chair Cell with Petroleum Coke and Sodium Cobalt Bronze

For this example, a real rocking chair cell was constructed; one in which the source of ions to be intercalated into the carbon is itself an intercalation compound. Towards this end we used an unoptimized sodium ion rocking chair cell with a solid polymer electrolyte. A cathode consisting of P2 phase $Na_{0.6}CoO_2$ in P (EO)$_8$-NaTf, and anode consisting of petroleum coke, ground 25 hours, in P (EO)$_8$NaTf. The charge capacity of the electrodes were matched initially (P2 phase $Na_{0.6}CoO_2$ is halfway discharged) and loading levels were 30 percent by weight electroactive material for both cathode and anode. Cells were heated to 110° C. before charging at 25 $\mu A/cm^2$. Some overcharging (20% of initial capacity) improved the discharge performance of the cells (overcharge not shown). While these results serve to illustrate the concept of the solid polymer electrolyte rocking chair cell, they almost certainly do not represent the best performance available, for the reasons stated above. It is expected that higher rates of discharge and longer periods of discharge above 1 V should be readily attainable.

We claim:

1. A method for intercalating metal ions into carbon for use as an electrode in a secondary cell comprising the steps of:
    a) Admixing a carbon powder, an ion conducting polymer, a powder of an alkali metal salt, and a powder of a carbon dispersant,
    b) Mixing together the resulting dry combination with a solvent, c) Applying the resulting mixture onto a drying surface,
d) Evaporating said solvent,
e) Removing the resulting electrode from said drying sheet,
f) Cutting said electrode into desired shapes,
g) removing residual water from said electrode.

2. The method as recited in claim 1, wherein step g) comprises removing residual water in a vacuum.

3. The method as recited in claim 1, wherein said carbon powder is selected from the group consisting of graphite, petroleum coke, Shawinigan Black, Acetylene Black, asphalt pitch, pyrolysed benzene, buckminsterfullerenes, petroleum pitch.

4. The method as recited in claim 3, wherein said carbon powder is selected from the group consisting of graphite, petroleum coke, Shawinigan Black, Acetylene Black.

5. The method as recited in claim 1, wherein said ion conducting polymer is comprised of a gelled polymer electrolyte.

6. The method as recited in claim 1, wherein said ion conducting polymer is selected from the group consisting of polyethylene oxide, oxymethylene-linked poly(oxyethylene), siloxane-linked poly(oxymethylene), carbonate-linked poly(oxyethylene), urethane-linked poly(oxyethylene), phosphate-linked poly(oxyethylene), polypropylene oxide, block copoly(oxyethylene/oxypropylene), methoxy ethoxy ethoxy ethoxy phosphazene.

7. The method as recited in claim 5, wherein said gelled polymer electrolyte is selected from the group consisting of
 a) polyethylene oxide (PEO) complexed with an alkali metal salt and containing 10–80% by weight ethylene carbonate, propylene carbonate or a mix of the two,
 b) polyethylene oxide (PEO) complexed with an alkali metal salt and containing 10–80% by weight PEGDME,
 c) polyacrylonitrile (PAN) complexed with an alkali metal salt, and containing 10–80% by weight ethylene carbonate,
 d) polyvinylidene fluoride (PVdF) complexed with an alakali metal salt and containing $\gamma$-butyrolactone, N,N,DMF, propylene carbonate, N,N,DMA, or ethylene carbonate.

8. The method as recited in claim 1, wherein said alkali metal salt is selected from the group consisting of lithium trifluoromethanesulfonate, lithium perchlorate, lithium iodide, lithium tetraflouroborate, lithium hexafluoroarsenate, sodium trifluoromethanesulfonate, sodium perchlorate, sodium iodide, sodium tetraflouroborate, sodium hexafluoroarsenate.

9. The method as recited in claim 1, wherein said carbon dispersant is selected from the group consisting of polyoxyethylene(4) lauryl ether, polyoxyethylene(23) lauryl ether, polyoxyethylene(20) cetyl ether, polyoxyethylene(20) stearyl ether, polyoxyethylene(20) oleyl ether, Triton X-100.

10. The method as recited in claim 1, wherein said solvent is selected from the group consisting of acetonitrile, isopropyl alcohol, water, propylene carbonate, polyethylene glycols, polyethylene glycols with dimethoxyethane end groups, $\gamma$-butyrolactone, DMF, DMA.

11. A method for intercalating metal ions into carbon for use as an electrode in a secondary cell comprising the steps of:
 a) Admixing a carbon powder, an ion conducting polymer, a powder of an alkali metal salt, and a powder of a carbon dispersant;
 b) Mixing together the resulting dry combination with a solvent,
 c) Applying the resulting mixture onto current collectors,
 d) Evaporating said solvent for the resulting electrode,
 e) removing residual water from said electrode.

12. The method as recited in claim 11, wherein the step e) comprises removing residual water in a vacuum.

13. The method as recited in claim 11, wherein said carbon powder is selected from the group consisting of graphite, petroleum coke, Shawinigan Black, Acetylene Black, asphalt pitch, pyrolysed benzene, buckminsterfullerenes, petroleum pitch.

14. The method as recited in claim 13, wherein said carbon powder is selected from the group consisting of graphite, petroleum coke, Shawinigan Black, Acetylene Black.

15. The method as recited in claim 11, wherein said ion conducting polymer is comprised of a gelled polymer electrolyte.

16. The method as recited in claim 11, wherein said ion conducting polymer is selected from the group consisting of polyethylene oxide, oxymethylene-linked poly(oxyethylene), siloxane-linked poly(oxymyethylene), carbonate-linked poly(oxyethylene), urethane-linked poly(oxyethylene), phosphate-linked poly(oxyethylene), polypropylene oxide, block copoly(oxyethylene/oxypropylene), methoxy ethoxy ethoxy ethoxy phosphazene.

17. The method as recited in claim 15, wherein said gelled polymer electrolyte is selected from the group consisting of
 a) polyethylene oxide (PEO) complexed with an alkali metal salt and containing 10–80% by weight ethylene carbonate, propylene carbonate or a mix of the two,
 b) polyethylene oxide (PEO) complexed with an alkali metal salt and containing 10–80% by weight PEGDME,
 c) polyacrylonitrile (PAN) complexed with an alkali metal salt, and containing 10–80% by weight ethylene carbonate,
 d) polyvinylidene fluoride (PVdF) complexed with an alkali metal salt and containing $\gamma$-butyrolactone, N,N,DMF, propylene carbonate, N,N,DMA, or ethylene carbonate.

18. The method as recited in claim 11, wherein said alkali metal salt is selected from the group consisting of lithium trifluoromethanesulfonate, lithium perchlorate, lithium iodide, lithium tetraflouroborate, lithium hexafluoroarsenate, sodium trifluoromethanesulfonate, sodium perchlorate, sodium iodide, sodium tetraflouroborate, sodium hexafluoroarsenate.

19. The method as recited in claim 11, wherein said carbon dispersant is selected from the group consisting of polyoxyethylene(4) lauryl ether, polyoxyethylene(23) lauryl ether, polyoxyethylene(20) cetyl ether, polyoxyethylene(20) stearyl ether, polyoxyethylene(20) oleyl ether, Triton X-100.

20. The method as recited in claim 11, wherein said solvent is selected from the group consisting of acetonitrile, isopropyl alcohol, water, propylene carbonate, polyethylene glycols, polyethylene glycols with dimethoxyethane end groups, $\gamma$-butyrolactone, DMF, DMA.

* * * * *